US009182209B1

(12) United States Patent  (10) Patent No.: US 9,182,209 B1
Johnson  (45) Date of Patent: Nov. 10, 2015

(54) METHODS FOR MEASURING DISTANCE

(71) Applicant: Epoch Concepts, LLC, Onalaska, TX (US)

(72) Inventor: Kenneth Johnson, Onalaska, TX (US)

( * ) Notice: Subject to any disclaimer, the term of this patent is extended or adjusted under 35 U.S.C. 154(b) by 61 days.

(21) Appl. No.: 13/839,766

(22) Filed: Mar. 15, 2013

(51) Int. Cl.
*G01B 3/08* (2006.01)
(52) U.S. Cl.
CPC ........................................ *G01B 3/08* (2013.01)
(58) Field of Classification Search
CPC ......................................................... G01B 3/08
USPC ............................................ 33/783, 784, 792
See application file for complete search history.

(56) References Cited

U.S. PATENT DOCUMENTS

| | | | |
|---|---|---|---|
| 149,532 A | 4/1874 | Sherwin | |
| 509,096 A | 11/1893 | Preston | |
| 1,031,517 A | 7/1912 | Boyce | |
| 1,192,418 A | 7/1916 | Hallberg | |
| 1,355,724 A * | 10/1920 | Zhukoff | 33/811 |
| 2,030,320 A * | 2/1936 | Ricci | 33/796 |
| 2,232,824 A | 2/1941 | Maher | |
| 2,603,880 A | 7/1952 | Dunn | |
| 2,926,426 A * | 3/1960 | Lury | 33/832 |
| 3,190,008 A | 6/1965 | Weiss | |
| 3,374,545 A | 3/1968 | Monroe | |
| 3,492,737 A | 2/1970 | Swanson | |
| 3,745,661 A * | 7/1973 | Atzberger | 33/795 |
| 4,077,129 A * | 3/1978 | Nishikata | 33/784 |
| 4,106,204 A * | 8/1978 | Schader | 33/795 |
| 4,188,727 A * | 2/1980 | Matui | 33/796 |
| 4,553,337 A * | 11/1985 | Brewster | 33/199 R |
| 4,570,349 A * | 2/1986 | Finkelman et al. | 33/784 |
| 4,611,404 A | 9/1986 | Arsenault | |
| 4,612,656 A * | 9/1986 | Suzuki et al. | 377/24 |
| 4,782,595 A * | 11/1988 | Diewert | 33/796 |
| 4,807,400 A | 2/1989 | Corallo et al. | |
| 5,210,955 A | 5/1993 | Lewis | |
| 5,259,120 A | 11/1993 | Chapman et al. | |
| 5,293,131 A | 3/1994 | Semones et al. | |
| 5,377,421 A | 1/1995 | Isler | |
| 5,408,755 A | 4/1995 | Russell | |
| 5,430,954 A * | 7/1995 | Best et al. | 33/793 |

(Continued)

OTHER PUBLICATIONS

Flexbar Machine Corporation, Universal Caliper Accessory Kit, accessed Feb. 22, 2013, Flexbar Corp. Long Island, NY, USA; www.flexbar.com/shop/pc/UNIVERSAL-CALIPER-ACCESSORY-KIT-p4815.htm.

(Continued)

*Primary Examiner* — Christopher Fulton

(57) ABSTRACT

One or more specific embodiments disclosed herein includes a method for manually measuring the distance between a first and second point, comprising: providing a measuring device, placing the measuring device between the first and second points, moving the first or second elongated members, or both, from the first position to the second position, and determining the distance between the first and second points. The measuring device comprises: a first and second elongated member, wherein the first and second elongated members are disposed in substantially parallel relation to each other and are movable in relation to one another between a first and second position and a first scale that provides a first distance measurement and a second scale that provides a second distance measurement, wherein the distance between the first and second points is based at least in part on the combination of the first and second distance measurements.

3 Claims, 5 Drawing Sheets

(56) References Cited

U.S. PATENT DOCUMENTS

| | | | |
|---|---|---|---|
| 5,483,751 A * | 1/1996 | Kodato | 33/811 |
| 5,548,901 A | 8/1996 | Isler | |
| 5,551,162 A | 9/1996 | Struble | |
| 5,642,569 A | 7/1997 | Palmer | |
| 5,657,550 A | 8/1997 | Struble | |
| 6,145,207 A * | 11/2000 | Brunson | 33/199 R |
| 6,836,969 B1 | 1/2005 | Bates | |
| 2007/0068027 A1* | 3/2007 | Suzuki | 33/784 |
| 2008/0047158 A1* | 2/2008 | Saito et al. | 33/811 |
| 2011/0138645 A1* | 6/2011 | Zhang et al. | 33/784 |

OTHER PUBLICATIONS

Sears, Groovemaster Caliper Attachment Set, accessed Feb. 22, 2013; www.sears.com/ttc-groovemaster-caliper-attachment-set-model-30-463/p-SPM6048998705P.

Woodpeckers, One-Time Tool—Bar Gauge, accessed Feb. 22, 2013; www.woodpeck.com/ottbargauge.html.

Penn Tool Co., Groovemaster, accessed Feb. 22, 2013; PennTool Co., Maplewood, NJ, USA; www.penntoolco.com/catalog/products/products.cfm?categoryID=657.

\* cited by examiner

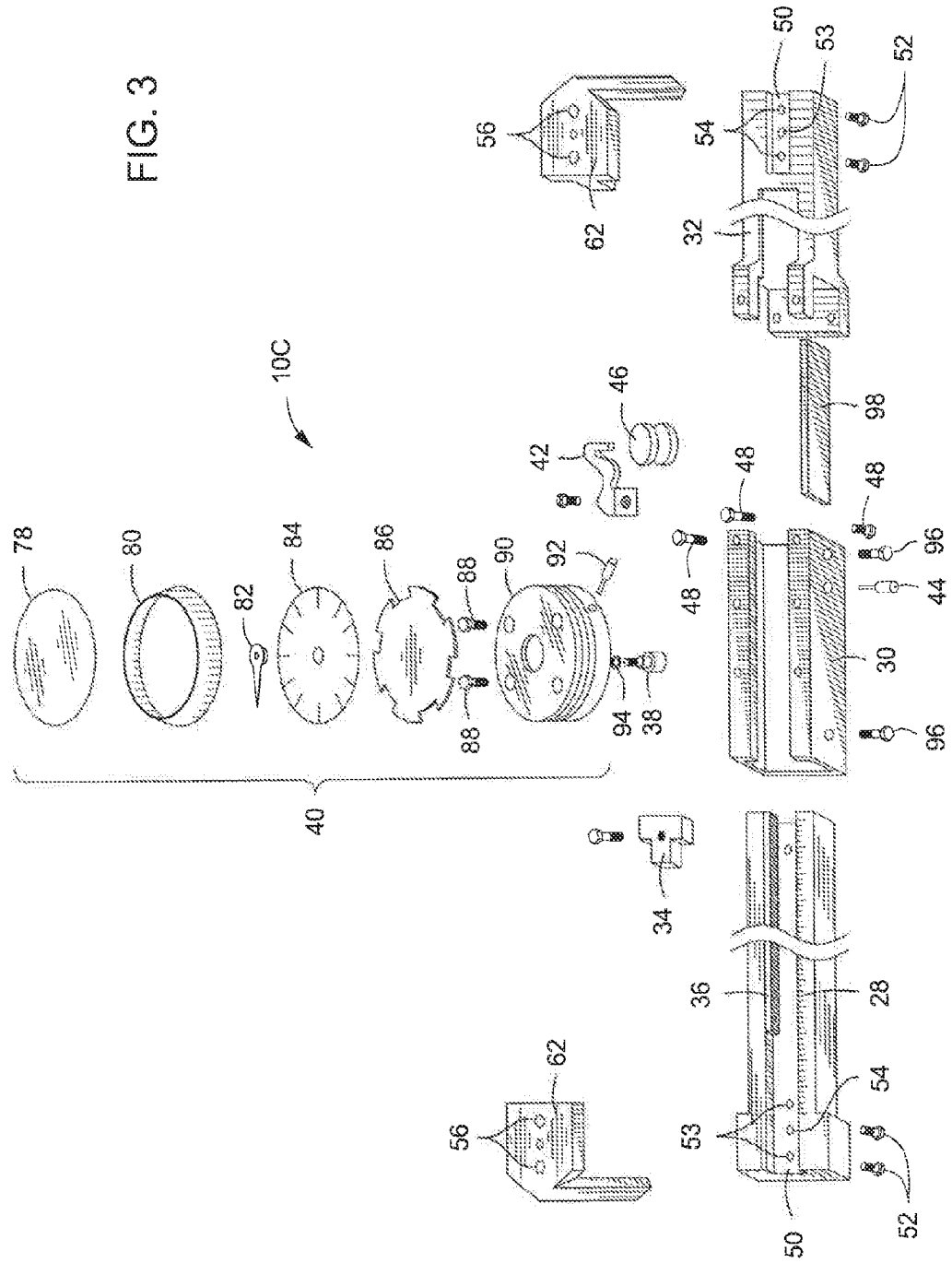

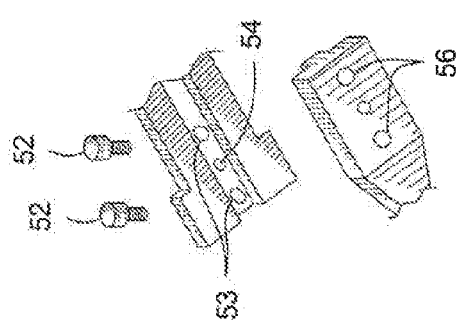
FIG. 5
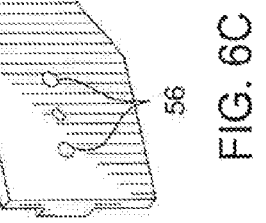
FIG. 6B
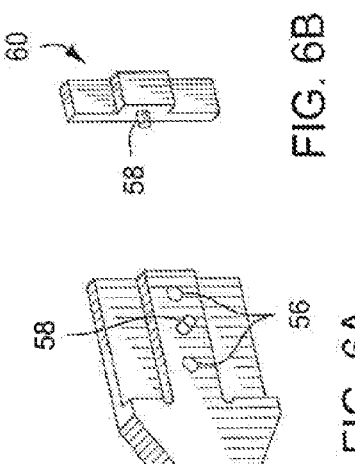
FIG. 6A
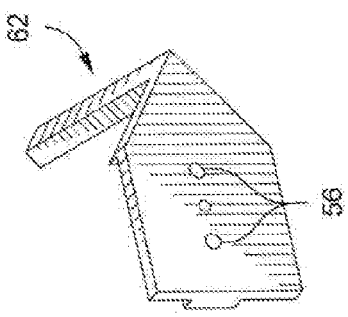
FIG. 6C
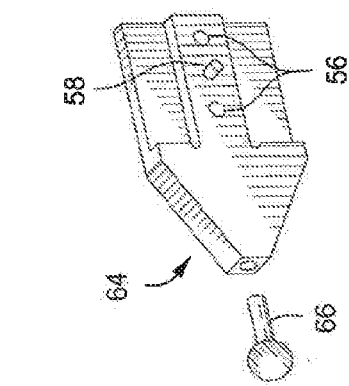
FIG. 8
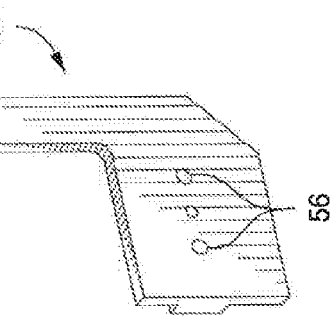
FIG. 9
FIG. 7

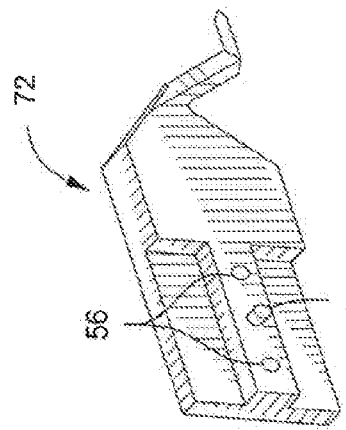
FIG. 10
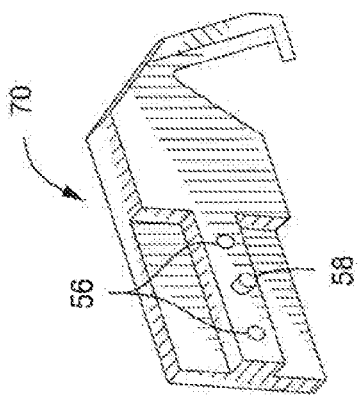
FIG. 12
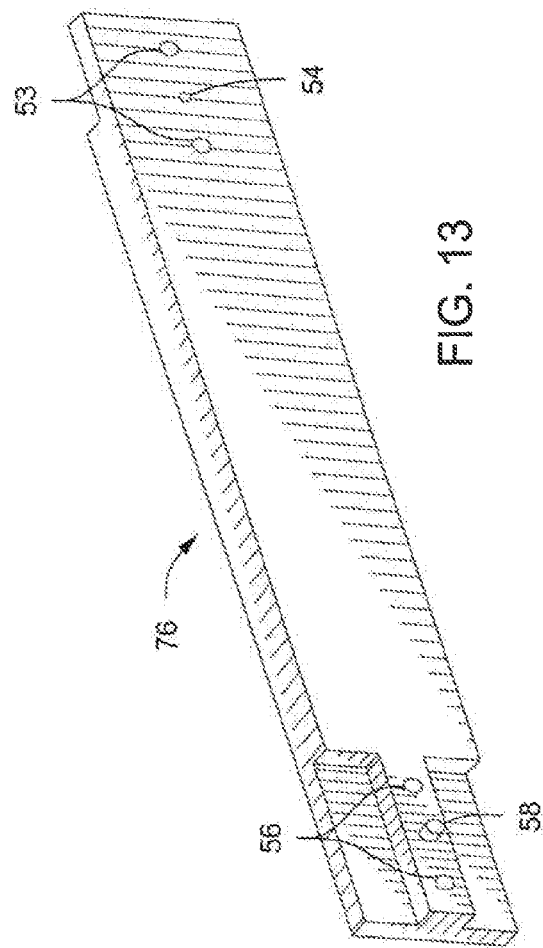
FIG. 11
FIG. 13

METHODS FOR MEASURING DISTANCE

BACKGROUND

1. Field of Inventions

The field of this application and any resulting patent is distance measurements.

2. Description of Related Art

Various methods and devices have been proposed and utilized to measure distance, including the methods and devices disclosed in the patents appearing on the face of this patent. However, these methods and devices lack all the steps or features of the methods and devices covered by the patent claims below. As will be apparent to a person of ordinary skill in the art, the methods and structures covered by the claims of this issued patent solve many of the problems that prior art methods and structures fail to solve. Also, it will be apparent that the methods and structures covered by claims of this patent have unpredictable benefits, and overcome many of the shortcomings inherent in some of those prior art methods and structures.

SUMMARY

One or more specific embodiments disclosed herein includes a method for manually measuring the distance between a first point and a second point, including: providing a measuring device, placing the measuring device between the first and second points, moving the first or second elongated members, or both, from the first position to the second position, and determining the distance between the first point and the second point. The measuring device may in certain embodiments include a first elongated member and a second elongated member, wherein the first and second elongated members are disposed in substantially parallel relation to each other and are movable in relation to one another between a first position and a second position and a first scale that provides a first distance measurement and a second scale that provides a second distance measurement, wherein the distance between the first point and the second point is based at least in part on the combination of the first distance measurement and the second distance measurement.

One or more embodiments disclosed herein includes a method for manually measuring the distance between a first point and a second point including: placing between the first point and the second point a device, including: two longitudinal members positioned adjacent and substantially parallel to one another, wherein the two longitudinal members are capable of sliding longitudinally with respect to one another in order to provide a distance measurement, sliding at least one of the longitudinal members so that the distance between the first point and the second point corresponds to the distance between the first tip and the second tip; observing the macro distance provided by the macro scale; observing the micro distance provided by the micro scale; and determining the distance between the first point and the second point based on the macro distance and the micro distance. The device may in certain specific embodiments include a macro scale capable of providing a macro distance and a micro scale capable of providing a micro distance, and a first tip and a second tip.

One or more embodiments disclosed herein includes a method for manually measuring the distance between a first point and a second point including: placing between the first point and the second point a device including: two longitudinal members positioned adjacent and substantially parallel to one another, wherein the two longitudinal members are capable of sliding longitudinally with respect to one another in order to provide a distance measurement, a first tip that includes: a first tip outer end that includes a first tip point capable of corresponding to the first point of the distance to be measured and an first tip inner end that includes at least one aperture sized to receive a locating pin, and a second tip that includes a second tip outer end that includes a second tip point capable of corresponding to the second point of the distance to be measured and a second inner end that includes at least one aperture sized to receive a locating pin.

One or more embodiments disclosed herein include a device for measuring distance including: two longitudinal members positioned adjacent and substantially parallel to one another and one or more distance gauges having both macro and micro scaling. The two members may in certain specific embodiments be capable of sliding longitudinally with relation to one another in order to obtain a distance measurement, and the distance measurement may be determined from opposite ends of the two members. In certain specific embodiments the macro and the micro gauges are each capable of using a single longitudinal movement to determine a measurement.

One or more embodiments disclosed herein includes a device for measuring distance including: two elongated members that are slidably coupled to one another and one or more distance gauges capable of accurately measuring a distance to at least 1/100th of an inch. In certain specific embodiments, the distance gauge may be capable of measuring the distance between opposite ends of the two elongated members.

One or more embodiments disclosed herein includes a device for measuring distance including: two or more telescoping sections and one or more scaled gauges. In certain embodiments the device is capable of precisely measuring the distance between the farthest end points of the device.

BRIEF DESCRIPTION OF THE DRAWINGS

FIG. 3 is an exploded view illustrating several elements of one example of a device capable of being used in one or more of the disclosed methods

FIG. 5 is a perspective view of one embodiment of a replacement tip and replacement tip receiver end.

FIG. 6A is a perspective front view of one embodiment of a replacement tip.

FIG. 6B is a perspective side view of one embodiment of a replacement tip.

FIG. 6C is a perspective rear view of one embodiment of a replacement tip.

FIG. 7 is a perspective front view of one embodiment of a replacement tip.

FIG. 8 is a perspective front view of one embodiment of a replacement tip.

FIG. 9 is a perspective front view of one embodiment of a replacement tip.

FIG. 10 is a perspective front view of one embodiment of a replacement tip.

FIG. 11 is a perspective front view of one embodiment of a replacement tip.

FIG. 12 is a perspective front view of one embodiment of a replacement tip.

FIG. 13 is a perspective front view of one embodiment of an extension member.

DETAILED DESCRIPTION

1. Introduction

Figure 1:
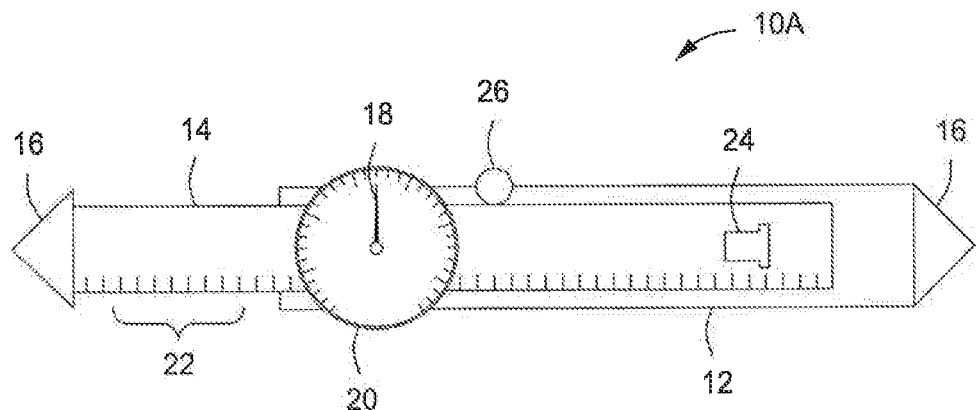
FIG. 1 is a simplified front view illustrating several elements found in one example of a device capable of being used in one or more of the disclosed methods.

A detailed description will now be provided. The purpose of this detailed description, which includes the drawings, is to satisfy the statutory requirements of 35 U.S.C. §112. For example, the detailed description includes disclosure of the inventor's best mode of practicing the inventions, a description of the inventions, and sufficient information that would enable a person having ordinary skill in the art to make and use the inventions referenced in the claims. In the figures, like elements are generally indicated by like reference numerals regardless of the view in which the elements appear. The figures are intended to assist the description and to provide a visual representation of certain aspects of the subject matter described herein. Those figures are not all necessarily drawn to scale, nor do they all show all the structural details of the apparatuses, nor do they limit the scope of the claims.

Each of the appended claims defines a separate invention, which for infringement purposes is recognized as including equivalents of the various elements or limitations specified in the claims. Depending on the context, all references below to the "invention" may in some cases refer to certain specific embodiments only. In other cases, it will be recognized that references to the "invention" will refer to the subject matter recited in one or more, but not necessarily all, of the claims. Each of the inventions will now be described in greater detail below, including specific embodiments, versions, and examples, but the inventions are not limited to these embodiments, versions, or examples, which are included to enable a person having ordinary skill in the art to make and use the inventions, when the information in this patent is combined with available information and technology. Various terms as used herein are defined below, and the definitions should be adopted when construing the claims that include those terms, except to the extent a different meaning is given within the specification or in express representations to the Patent and Trademark Office (PTO). To the extent a term used in a claim is not defined below, or in representations to the PTO, it should be given the broadest definition persons in the pertinent art have given that term as reflected in printed publications, dictionaries, and issued patents.

2. Selected Definitions

Certain claims include one or more of the following terms, which as used herein, are expressly defined as follows.

The term "scale" as used in the claims is broadly defined herein as a structure, or surface of a structure, that includes a series of equally-spaced gradations, exemplified as engraved linear or circumferential marks that are equidistant from one another. An example of a "scale" is a series of marks on an ordinary "ruler" or yardstick that are divided into fractions of inches or centimeters. Any structure that includes a "scale" as that term is used herein is an instrument capable of measuring some distance. Thus, a scale may consist of linear gradations disposed on or positioned along the surface of a longitudinal member, exemplified by certain longitudinal members disclosed herein and in the drawings. At least two types of "scales" discussed herein are a "macro scale and a "micro" scale, which are used herein as relative terms. In any measuring device disclosed herein that has a macro scale and a micro scale, the macro scale and the micro scale each identifies some lengthwise distance that is to be measured, e.g., the actual tip-to-tip distance from one outer edge of the device to the other outer edge of the device. Each of the spaced gradations of the macro scale corresponds to greater lengthwise distance of the measuring device than do each of the spaced gradations of the micro scale. Preferably, the micro scale is capable of identifying to a human observer smaller distances than the distances the macro scale is capable of identifying. Thus, for example, a macro scale may be calibrated to measure distances using a tenth of an inch interval or a 1 millimeter interval. A macro scale may be calibrated to measure distances using other intervals as well; however, the interval used in the macro scale should be capable of being read accurately by the human eye using a single set of linear graduations. A micro scale, for example, may be calibrated to measure distances at intervals smaller than a tenth of an inch or 1 millimeter, e.g., a micron interval or a thousandth of an inch interval. Examples of micro scales are a vernier scale, a dial scale, an electronic scale, or any combination of these three scales (further described below). Micro scales may be especially beneficial in machining and measuring a work piece that requires a limited tolerance of distance measurements. One of the benefits of certain specific embodiments described herein that include both a macro scale and a micro scale is that the macro scale can be used to identify the approximate or "rough" measurement of a particular distance, and the precise measurement of that distance can be obtained when the micro scale is used in combination with the macro scale. For example, a pipe with an inner diameter of 101.323 centimeters might be measured by one of the devices described herein, in which the macro scale indicates 101+ centimeters and the micro scale identifies the 0.323 centimeters, so that using the two scales in combination yields the precise distance of 101.323 centimeters.

The term "knob" as used in the claims is broadly defined herein as any structure that responds to applied pressure (e.g., some form of applied manual pressure, e.g., by a human hand or fingers) by transferring that applied pressure to another structure, e.g., through some bearing or intermediate member or structure. A knob may have any form, e.g., be rounded or squared; however, a knob is preferably rounded for the comfort of the device operator. One type of knob disclosed herein is a wheel, wherein rotational pressure applied to cause rotation of the wheel engages the device and causes two longitudinal members to slide with relation to one another. Preferably, the wheel is positioned in a location on the device where it is capable of being rotated by the thumb of a hand when gripping the device with the same hand. A knob may also be or include a grip which responds to lateral or lengthwise pressure, wherein a grip allows an operator to engage the device and indirectly cause the longitudinal members to slide in relation to one another. The grip is preferably positioned in a location on the device where it is capable of being engaged by the thumb of a hand while being gripped with the same hand. The position, e.g., positions described above, and existence of the knobs may provide an advantage by allowing the operator to manipulate the device with only one hand.

The term "tip" as used in the claims is broadly defined herein as a structure that is (or can be) located at, on, or proximate the outermost end of one of the longitudinal members. The tip structure is affixed or otherwise coupled to one of the longitudinal members. Preferably, the tip has an outer edge which includes a point and is preferably pointed or rounded. A tip may comprise two sections or parts, which are preferably halves: an outer tip section (end) and an inner tip section (end). The outer tip end includes the half or portion of the structure that includes the outermost point on that side of the device. The inner tip end includes the remaining half or portion of the structure that does not include the outermost point. As shown in the drawings herein, the tip can have various shapes and sizes, and can either be a single piece or it can be a combination of different parts that are assembled to provide the tip. An inner tip end may be coupled to and/or overlap a longitudinal member, such that the outer tip end is functionally a tip of the longitudinal member. Preferably, a tip is removably coupled to a longitudinal member at the inner tip end using one or more screws; however, other removable attachment mechanisms may be used. The tip may also be permanently affixed to the longitudinal member. A tip may have various shapes, such as those shown in FIGS. 6-12, that permit the tip to access end points not easily accessible using other tip shapes. A tip may comprise a locating pin or hole which corresponds to a locating pin or hole on a longitudinal member, such that the tip may be coupled to the longitudinal member at a particular location or orientation when the locating pin and hole are aligned.

The term "vernier scale" as used in the claims is broadly defined herein as a scale made to slide along the divisions of a graduated instrument for indicating parts of divisions. A vernier scale may include graduations that are spaced at a constant fraction or interval of the fixed main scale, e.g. $9/10$ths of a millimeter or $9/100$ths of an inch. A vernier scale may be accurately read to determine the correct division fraction by determining where the mark on the main scale lines up with a mark on the vernier scale.

The term "dial" as used in the claims is broadly defined herein as a face upon which some measurement can be registered, preferably using graduations and a needle. A dial is preferably mechanically controlled by rotational movement of the needle around the face; however, digital controls may also be used. A dial may serve as a micro scale or macro scale by indicating the distance traveled by a connected gear, wherein one full rotation of the dial corresponds to one full rotation of the gear, wherein one full rotation of the gear corresponds to a known linear distance that the gear has traveled along a gear rack. Linear movement of the gear rack in relation to the gear causes the gear and coupled dial needle to rotate and indicate a distance using the graduations of the face of the dial.

The term "digital display" as used in the claims is broadly defined herein as a structure that visually displays digital information. Thus, the information displayed by a digital display includes actual numbers (e.g., "352.32 mm"), and the numbers are preferably derived from an electrical signal. For example, a digital display may include numbers that are derived from capacitance. A digital display preferably presents a distance measurement in whole or in part. A digital display preferably uses alphanumeric characters to present information, but may also display the information by other means, e.g., as a needle on a dial.

The term "coupled to" as used in the claims is broadly defined herein as attached, joined to, fastened together, affixed to, or directly or indirectly influenced by. Two members that are coupled to one another may be permanently coupled, e.g., welded or mechanically pressed together, or they may be removably coupled, e.g., attached with removable screws, The term "graduations" as used in the claims is broadly defined herein as markings that indicate a measurement, preferably a distance measurement. Linear graduations may be present on a straight instrument capable of measuring linear distances. Graduations may be found along the circumference of a dial face, and measurement may be indicated by a needle that circles the dial face. The dial face may be capable of measuring linear distance. Graduations may directly or indirectly be related to the distance measurement determined. Graduations may be present in many different intervals, preferably intervals of inches, centimeters, tenths of an inch, millimeters, tenths of a millimeter, hundredths of an inch, hundredths of a millimeter, and thousandths of an inch.

The phrase "can be performed with one hand" as used in the claims is broadly defined herein as capable of use with only a single human hand. A measurement may be obtained with only a single hand by using the various knobs on the device. This provides an advantage because a desired measurement on a work piece may not be accessible using both hands. Using an embodiment of the device to measure distance may be performed with one hand due to various features found on the device, e.g., knobs.

3. Certain Specific Embodiments

Now, certain specific embodiments are described, which are by no means an exclusive description of the "invention." Other specific embodiments, including those referenced in the drawings, are encompassed by this application, and any patent that issues therefrom.

One or more specific embodiments disclosed herein includes a method for manually measuring the distance between a first point and a second point, including: providing a measuring device, placing the measuring device between the first and second points, moving the first or second elongated members, or both, from the first position to the second position, and determining the distance between the first point and the second point. The measuring device may in certain embodiments include a first elongated member and a second elongated member, wherein the first and second elongated members are disposed in substantially parallel relation to each other and are movable in relation to one another between a first position and a second position and a first scale that provides a first distance measurement and a second scale that provides a second distance measurement, wherein the distance between the first point and the second point is based at least in part on the combination of the first distance measurement and the second distance measurement.

One or more embodiments disclosed herein includes a method for manually measuring the distance between a first point and a second point including: placing between the first point and the second point a device, including: two longitudinal members positioned adjacent and substantially parallel to one another, wherein the two longitudinal members are capable of sliding longitudinally with respect to one another in order to provide a distance measurement, sliding at least one of the longitudinal members so that the distance between the first point and the second point corresponds to the distance between the first tip and the second tip; observing the macro distance provided by the macro scale; observing the micro distance provided by the micro scale; and determining the distance between the first point and the second point based on the macro distance and the micro distance. The device may in certain specific embodiments include a macro scale capable of providing a macro distance and a micro scale capable of providing a micro distance, and a first tip and a second tip.

One or more embodiments disclosed herein includes a method for manually measuring the distance between a first point and a second point including: placing between the first point and the second point a device including: two longitudinal members positioned adjacent and substantially parallel to one another, wherein the two longitudinal members are capable of sliding longitudinally with respect to one another in order to provide a distance measurement, a first tip that includes: a first tip outer end that includes a first tip point capable of corresponding to the first point of the distance to be measured and an first tip inner end that includes at least one aperture sized to receive a locating pin, and a second tip that includes a second tip outer end that includes a second tip point capable of corresponding to the second point of the distance to be measured and a second inner end that includes at least one aperture sized to receive a locating pin.

One or more embodiments disclosed herein include a device for measuring distance including: two longitudinal members positioned adjacent and substantially parallel to one another and one or more distance gauges having both macro and micro scaling. The two members may in certain specific embodiments be capable of sliding longitudinally with relation to one another in order to obtain a distance measurement, and the distance measurement may be determined from opposite ends of the two members. In certain specific embodiments the macro and the micro gauges are each capable of using a single longitudinal movement to determine a measurement.

One or more embodiments disclosed herein includes a device for measuring distance including: two elongated members that are slidably coupled to one another and one or more distance gauges capable of accurately measuring a distance to at least 1/100th of an inch. In certain specific embodiments, the distance gauge may be capable of measuring the distance between opposite ends of the two elongated members.

One or more embodiments disclosed herein includes a device for measuring distance including: two or more telescoping sections and one or more scaled gauges. In certain embodiments the device is capable of precisely measuring the distance between the farthest end points of the device.

In any of the methods or structures disclosed herein, the device may further include a micro scale and a macro scale, wherein longitudinal sliding movement of two longitudinal members with respect to one another may engage both the macro scale and the micro scale.

Any of the methods or structures disclosed herein may involve measuring the distance between a first point and the second point in which such measuring may be capable of being performed with one hand.

In any of the methods or structures disclosed herein, moving the first or second elongated members, or both, from the first position to the second position may engage both the first scale and the second scale.

In any of the methods or structures disclosed herein, the first member may be positioned within a length-wise disposed cavity of the second member.

In any of the methods or structures disclosed herein, the device may further comprise two end members removably coupled to the longitudinal members and positioned such that the distance between the first point and the second point may be determined from the tips of the end members.

In any of the methods or structures disclosed herein, the device may comprise one or more knobs which may be capable of causing longitudinal movement of the first elongated member, the second elongated member, or both elongated members in relation to one another.

In any of the methods or structures disclosed herein, the device may include a grip directly or indirectly coupled to one of the two members, wherein longitudinal movement of the grip may cause one elongated member to move longitudinally in relation to the other elongated member from a first position to a second position.

In any of the methods or structures disclosed herein, the device may include a wheel coupled to one of the two members, wherein rotation of the wheel may cause one elongated member to move longitudinally in relation to the other elongated member from a first position to a second position. (Note: The terms "first position" and "second position" as used herein do not refer to specific positions, but indicate that the two positions are themselves different from one another. Also, the use of the terms "first" and "second" does not signify any particular sequence or level of importance but rather are used to differentiate whatever they are referring to.)

Any of the methods or structures disclosed herein may involve increasing the length of the device which may be performed, for example, by providing an expansion member removably coupled to the first elongated member, the second elongated member, or both elongated members.

In any of the methods or structures disclosed herein, the distance between the first point and the second point may be determined using a variety of intervals, e.g., an interval no greater than a $1/100^{th}$ of an inch.

In any of the methods or structures disclosed herein, the first scale, the second scale, or both scales may comprise linear graduations.

In any of the methods or structures disclosed herein, at least one scale may comprise a vernier scale.

In any of the methods or structures disclosed herein, at least one scale may comprise a dial.

In any of the methods or structures disclosed herein, longitudinal motion of the first elongated member in relation to the second elongated member may cause rotational motion of a gear that may be coupled to at least one scale.

In any of the methods or structures disclosed herein, at least one scale may comprise a digital display.

In any of the methods or structures disclosed herein, at least one scale may utilize electronic capacitance to determine distance.

In any of the methods or structures disclosed herein, the digital display may be remotely connected to a transmitter on the device.

In any of the methods or structures disclosed herein, a gear rack is coupled to one of the elongated members such that longitudinal motion of the first elongated member in relation to the second elongated member causes rotational motion of a gear that is coupled to at least one scale.

4. Specific Embodiments in the Figures

In FIG. 1, a simplified illustration of a measuring device 10A is depicted, showing telescoping longitudinal members, which are slidable with respect to one another, and are capable of at least partially overlapping one another when they are slid with respect to one another. One of the slidable members of device 10A in FIG. 1 is outer member 12, which includes a lengthwise-disposed channel that receives inner member 14, which is slidably and moveably coupled to the outer member 12. In this particular embodiment, outer member 12 and inner member 14 are in contact with one another, although it is contemplated that two members may be coupled to one another and yet not be in contact with one another, e.g., if one or more intermediate structures is positioned between them. In an alternative arrangement (not shown in the drawings), the inner member 14 and outer member 12 may be slidably disposed with respect to one another so that one member is positioned adjacent and parallel to the other member, rather than being positioned within the channel of the other member as depicted in FIG. 1.

Device 10A also includes at least one measurement gauge. Specifically, for example, device 10A includes a "macro" measurement gauge, which can be used to measure the tip-to-tip lengthwise (longitudinal) distance of device 10A using "macro" scale gradations 22. Device 10A also includes a "micro" measurement gauge, which can be used to measure the tip-to-tip lengthwise distance, and this particular micro measurement gauge includes a micro scale dial 20 and a gauge 18. Alternatively, a vernier scale or an electronic or digital reader may be used as a micro scale gauge. An electronic or digital gauge may be capable of relaying measurements remotely. An example of an electronic gauge is found on SPI® Electronic Caliper Series, part number 13-613-5. In operation, to obtain a precise measurement of a particular tip-to-tip distance, an operator may "collapse" the device 10A to some extent by sliding the inner member 14 and outer member 12 towards one another to reduce the overall tip-to-tip length of the device 10A to a desired length, e.g., to the shortest length possible. The user may then place the device 10A between the end points of some distance to be determined, e.g., the inner diameter of a cylindrical work-piece. For example, in order to measure the inner diameter of a pipe, an operator may place the device 10A inside a pipe and adjust the device 10A so that one tip is touching one inner surface of the pipe and the other tip is touching the opposite inner surface of the pipe; the distance from tip-to-tip preferably equals the inner diameter of the pipe. In placing the device 10A, the operator may first place the collapsed device 10A into the inside of the pipe, proximate where the inner diameter of the device 10A is to be measured. Then, the operator can slide the inner member 14 and outer member 12 longitudinally away from each other using the grip 24 and/or the wheel 26 in order to increase the tip-to-tip length of the device 10A. At some point during the sliding, each of the two end members 16 may contact the opposing inner surfaces of the work-piece, e.g., the pipe, at which point the two members 12, 14 can no longer be slid apart with respect to each other, and the tip-to-tip distance defines the distance to be measured by the gauge(s). In device 10A, the precise distance measurement may be read by combining the macro-distance measurement using the macro scale graduations 22 with the micro-distance measurement using the micro scale gauge 18.

Figure 2A:
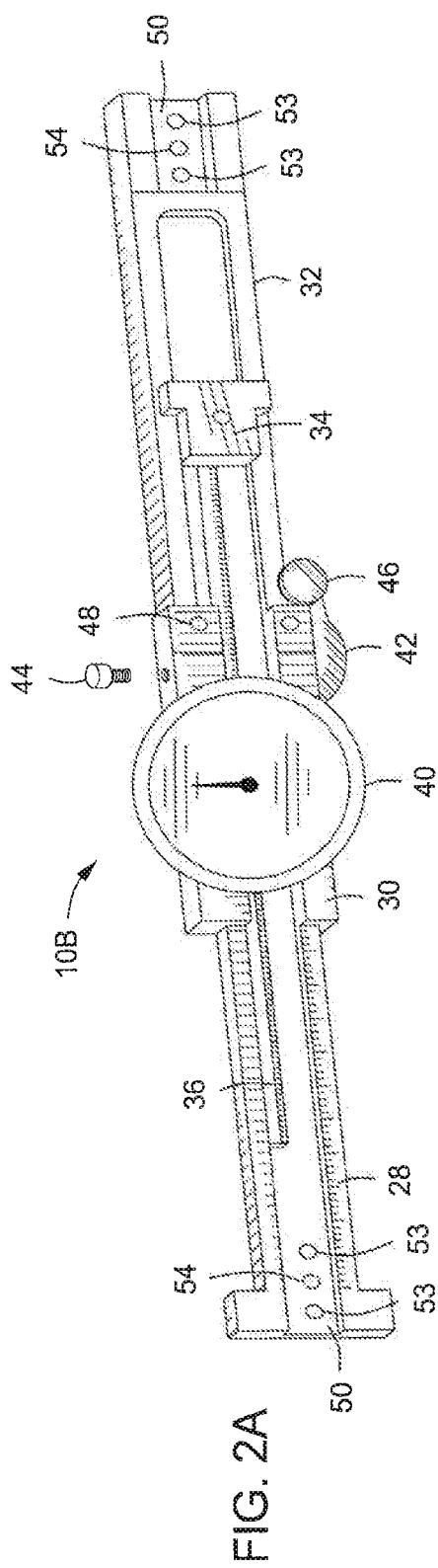
FIG. 2A is a perspective view illustrating several elements of one example of a device capable of being used in one or more of the disclosed methods.
Figure 2B:
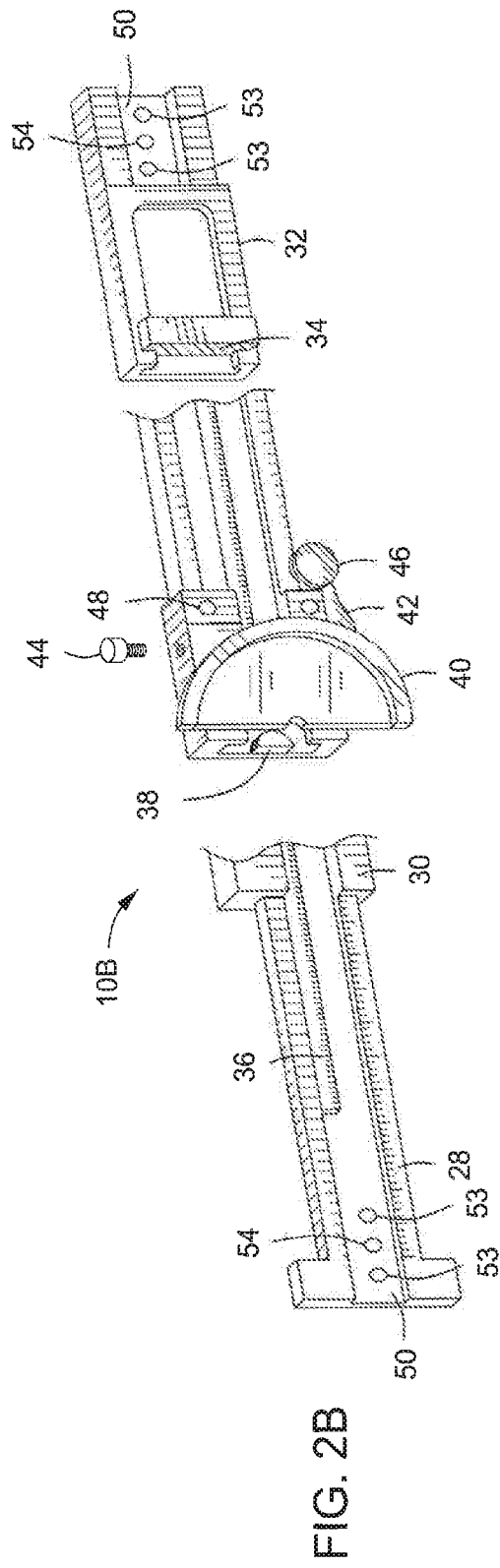
FIG. 2B is a perspective view having two cut away views illustrating interior elements in one example of a device capable of being used in one or more of the disclosed methods.

In FIGS. 2A and 2B, another specific embodiment of a measuring device 10B is shown, which includes more details than device 10A in FIG. 1. FIG. 2A shows the measuring device 10B from a front perspective view. One of the longitudinal members, which includes caliper frame 28, may be disposed in slidable relation to another member, which can include either slide body 30 alone, or both slide body 30 and a rear slide cap 32. The slide body 30 may be affixed to the rear slide cap 32 using locking pins 48. When slide body 30 is affixed to the rear slide cap 32 using locking pins 48, the caliper frame 28 may now be capable of sliding in relation to the member that includes the slide body 30 and rear slide cap 32; thus both slide body 30 and rear slide cap 32 may move as a single element when the locking pins 48 are in place. Alternatively, the slide body and end cap may be manufactured as a single element that does not require a connection. The caliper frame 28 may include a linear measurement scale capable of indicating a distance measurement, similar to the "macro" scale gradations 22 in the device 10A of FIG. 1

The device 10B may include two knobs capable of changing the length of the device. The operator may use one or both of these knobs to slide the caliper frame 28 in relation to the slide body 30 and/or rear slide cap 32. One knob may be a grip 34 that is attached to the caliper frame 28. An additional (or alternate) knob is a wheel 46 which in FIG. 2A is mounted to the device 10B by a slide body grip 42. The wheel 46 may contact the caliper frame 28 through an opening in the rear slide cap 32. The wheel 46 may be rotated by an operator to cause the caliper frame 28 to move in relation to the slide body 30, e.g., by sliding. The caliper frame 28 may be prevented from moving in relation to the slide body 30 and rear slide cap 32 by tightening one or more locking screws 44, which when tightened will frictionally engage the caliper frame 28 and prevent it from sliding The device 10B may include a dial reader 40 which is capable of indicating a distance measurement. The dial reader 40 may include a micro scale which indicates distance traveled that is easily discerned through a uniformly-divided straight measurement scale, similar to gradations 22 in FIG. 1. The device 10B may include a gear rack 36 which may be capable of directly or indirectly engaging the dial reader 40 such that linear motion of the gear rack 36 (such as when the caliper frame 28 is moving in relation to the slide body 30) may be translated into rotational motion, which then may move an gauge on the dial reader 40.

The device 10B may include replacement tips to expand the utility of the device 10B, making it capable for use in measuring a variety of different types of structures and work-piece configurations (discussed below). For example, the device 10B may comprise replacement tip receivers 50 either on or proximate to opposite ends of the device 10B, e.g., one positioned on the caliper frame 28 and another positioned on the rear slide cap 32. One or more locating holes 54 may be positioned to accept one or more locating pin 58 preferably found on each replacement tip (see FIGS. 6A, 6B, 8, 10-13). One or more screw holes 53 may be positioned to align with one or more threaded screw holes 56 preferably found on each replacement tip (see FIGS. 5-13). To attach the replacement tip to the replacement tip receiver 50, the two may be aligned using the locating pin 58 and locating hole 54, then one or more tip mounting screws 52 may be passed through the screw holes 56 on the caliper frame 28 and rear slide cap 32 and threaded into the threaded screw holes 56 on each of the replacement tips (see FIG. 5). Other means of removably attaching the replacement tips are also available, e.g., snap connections, spring connections, friction connections, and other connection systems known in the art. Each of the replacement tips is discussed below in greater detail with respect to FIGS. 5-13.

FIG. 2B shows a cutaway view of a specific embodiment of the device 10B in two locations, one showing the mechanism of the dial reader 40 and the other showing the positioning of caliper frame 28 inside the rear slide cap 32. The gauge of the dial reader 40 may be connected to a gear 38, which is preferably engaged with the gear rack 36. The gear 38 and gauge of the dial reader 40 may rotate as the caliper frame 28 and gear rack 36 slide longitudinally in relation to the slide body 30 and rear slide cap 32.

The second cutaway in FIG. 2B depicts the preferred caliper frame 28 position within the rear slide cap 32. The caliper frame 28 may snugly fit within the rear slide cap 32 while still being capable of sliding within the rear slide cap 32. The grip 34 may be attached near or on the caliper frame 28 edge that is opposite the replacement tip receiving end 50. The operator of the device 10B may be capable of moving the caliper frame 28 in relation to the rear slide cap 32 by applying pressure in the longitudinal direction on the grip 34.

FIG. 3 shows an exploded view of a specific embodiment of the measuring device 10C which is similar or identical to device 10B in FIGS. 2A and 2B. Caliper frame 28 may be slidably disposed in relation to the slide body 30 and rear slide cap 32, utilizing a gib 98 that may provide a bearing surface between the slide body 30 and the caliper frame 28. While a gib 98 may provide a bearing surface, other means of providing for movement of the caliper frame 28 in relation to the slide body 30 and rear slide cap 32 may also be used. The lateral movement of the gib 98 may be adjusted to be more or less restricted by correspondingly tightening or loosening the one or more gib adjusting screws 96. The slide body 30 may be affixed to the rear slide cap 32 using one or more locking pins 48.

The device 10C may include one or more knobs which the operator may use to slide the caliper frame 28 in relation to the slide body 30 and rear slide cap 32. One knob may be a grip 34, which may be attached to the caliper frame 28. The grip 34 may be positioned on the opposite end from the replacement tip receiver 50 of the caliper frame 28 such that it may prevent the caliper frame 28 from completely sliding out of the slide body 30 and rear slide cap 32. An additional or alternative knob may be a wheel 46, which may be mounted to the slide body 30 by the slide body grip 42. The wheel 46 may contact the caliper frame 28 through an opening in the rear slide cap 32. The wheel 46 may be rotated to cause the caliper frame 28 to slide in relation to the slide body 30. The caliper frame 28 may be prevented by an operator from moving in relation to the slide body 30 and rear slide cap 32 by tightening one or more locking screws 44, thus frictionally engaging the caliper frame 28.

The device 10C may include a dial reader 40 which may be capable of indicating a distance measurement. The dial reader 40 may be mounted onto the slide body 30 by one or more base mounting screws 88. The gauge 82 of the dial reader 40 may be attached to a gear 38 by an elongated stem connected to and extending axially from the gear. Retainer clip may be provided to hold the gear 38 and attached stem centered with respect to the dial gauge 40.

The gear 38 may be engaged by a gear rack 36 such that linear motion of the gear rack 36 (such as when the caliper frame 28 is moving in relation to the slide body 30) may be translated into rotational motion of the gear 38 and attached gauge 82. The rotational motion may then move the gauge 82 around the dial reader 40, and an operator may read a measurement off the dial reader card 84. The dial reader 40 may include a face card ring 80 and a spring wire retainer 86 sandwiching the dial reader card 84. The face card ring 80 may be capable of rotating about the circumference of the dial reader 40. When rotated, the face card ring 80 may cause the dial reader card 84 to rotate independently from the gauge 82. This may be done to "zero" the reading on the dial reader 40. Once adjusted, the dial reader card 84 may be immobilized by a reader card lock screw 92, and the device 10C may resume normal functions. The dial reader card 84 may be protected by a clear face 78 comprising glass or plastic polymer.

The device 10C may include replacement tips, such as the embodiment of the extended jaw inner/outer diameter and length measuring tip 62 that expand the utility of the device 10C such that it may measure various dimensions. The device 10C may comprise replacement tip receivers 50 on opposite ends of the device 10C, one on the caliper frame 28 and one on the rear slide cap 32. One or more locating holes 54 may be positioned to accept one or more locating pins 58 preferably found on both replacement tips 62. One or more screw holes 53 may be positioned to align with one or more threaded screw holes 56 preferably found on both replacement tips 62. To attach the replacement tips 62 to the replacement tip receivers 50, the two may be aligned using the locating pins 58 and locating holes 54. Tip mounting screws 52 may then be passed through the screw holes 56 on the caliper frame 28 and rear slide cap 32 and threaded into the threaded screw holes 56 on both of the replacement tips 62.

Figure 4:
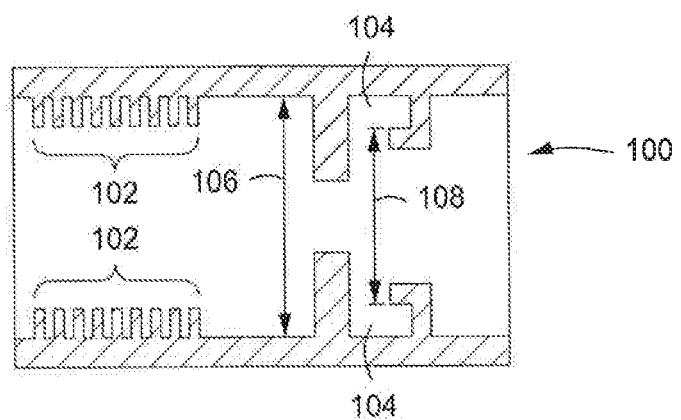
FIG. 4 is a simplified cut away view of an example work piece having distances that can be measured using one or more of the disclosed methods.

Referring now to FIG. 4, an example work-piece 100 is depicted. The work-piece is provided to illustrate some of the measurement applications that devices 10A-C can be used for. Threading 102 presents a problem to many prior art devices because they would not be able to fit between the threads to take groove measurements. Devices 10A-C, however, may include replacement tip 72 comprising a thin protrusion capable of reaching locations inaccessible to many prior art devices. Replacement tip 64 comprising replacement ball gauges may also be particularly useful in this case when a smaller ball gauge is available. Crevice 104 is another example of a difficult measurement to obtain. The extended jaw inner/outer diameter and length measuring 62 and extended jaw 90° inner/outer diameter and length measuring 68 comprise protrusions that are capable of accessing difficult to reach crevices, e.g. crevice 104. The protrusion could be used to measure distance 106, as well as distance 108. An operator could insert the protrusions of tip 62 or 68, rotate the protrusions so that they contact the innermost wall of crevice 104, and collapse the device so that distance 108 can be ascertained.

Referring now to FIG. 5, a depiction of the preferred engagement of the replacement tips with the replacement tip receiver 50 is shown. Each replacement tip may comprise at least one locating pin 58 that may assist in the alignment of the replacement tip with the replacement tip receiver 50. The locating pin 58 of the replacement tip, when properly aligned, may fit into one or more locating holes 54 of the replacement tip receiver 50. The replacement tip receiver 50 and replacement tip may include other features that assist in alignment of the replacement tip with the replacement tip receiver 50, such as the groove depicted on the replacement tip receiver 50 and the corresponding protrusion on the replacement tips (see FIGS. 5-13). After properly positioning the replacement tip with the replacement tip receiver 50, one or more screw holes 53 and one or more threaded screw holes 56 may be aligned to receive one or more tip mounting screws 52 to removably affix the replacement tip with the replacement tip receiver 50.

Referring now to FIGS. 6A, 6B, 6C, and 7-12, various embodiments of replacement tips are depicted, each of which may be used with the device to measure various types of distances, including but not limited to inner groove diameter, outer groove diameter, inner or outer part length or diameter, and face groove diameter. These varying tips may allow the device to access and measure distances that may not normally be accessible to a device without such versatility.

Referring now to FIGS. 6A, 6B, and 6C, an embodiment of a solid point inner diameter measuring tip 60 is depicted. FIG. 6A shows a front view of the replacement tip 60, detailing the preferred positions of the threaded screw holes 56 and the locating pin 58. The locating pin 58 may be positioned between the threaded screw holes 56, but this particular arrangement is not required. FIG. 6B shows a side view depicting the locating pin 58 as a protrusion on the front face of the replacement tip 60. The locating pin 58 may be various lengths, but the length should relate in some way to the measurements of the locating hole 54 in the replacement tip receiver 50. FIG. 6C shows a back view of the replacement tip 60. Preferably, the threaded screw holes 56 pass all the way through the replacement tip 60, as depicted, such that the tip mounting screws 52 need not be a particular length. The back and front faces of the variety of replacement tip embodiments may be substantially similar, while the tip portion of the replacement tip embodiments may vary in order to allow the operator to measure various types of distances. The replacement tip 60 depicted in FIGS. 6A-C may be particularly useful in measuring the distance between the inside face of two surfaces, such as an inner diameter. The removable attachment mechanism may be similar to that depicted in FIG. 4

Referring now to FIG. 7, an embodiment of an extended jaw inner/outer diameter and length measuring tip 62 is depicted. A protrusion may extend perpendicular to the front face of the replacement tip 62. This replacement tip 62 may be particularly useful in measuring distance between the inner faces or outer faces of an object, such as inner or outer diameter, or many other distances known to those having ordinary skill in the art. One or more of the dimensions of the protrusion may be known so that an operator may take them into account when determining the measurement indicated by the device. The rear, front, and side views may be substantially similar to that shown in FIGS. 6A-C, and the removable attachment mechanism may be similar to that depicted in FIG. 5.

Referring now to FIG. 8, an embodiment of a ball receiver tip 64 is depicted. The replacement tip 64 may comprise a cavity on the tip portion of replacement tip 64 that may be capable of receiving replacement ball gauges 66 of various sizes, such that the operator may choose between ball gauge sizes for one suitable to his application. This replacement tip 64 may be particularly useful for obtaining measurements at threads, dovetails, and tapered intersections, as well as having other advantages known to those having ordinary skill in the art. The rear, front, and side views may be substantially similar to that shown in FIGS. 6A-C, and the removable attachment mechanism may be similar to that depicted in FIG. 5.

Referring now to FIG. 9, an embodiment of an extended jaw 90° inner/outer diameter and length measuring tip 68 is depicted. A protrusion may extend in the same plane as the front face of the replacement tip 68, but may be perpendicular to the longitudinal dimension of the device. This replacement tip 68 may be particularly useful in measuring distance between the inner faces or outer faces of an object, such as an inner or outer diameter, or many other distances known to those having ordinary skill in the art. One or more of the dimensions of the protrusion may be known so that an operator may take them into account when determining the measurement indicated by the device. The rear, front, and side views may be substantially similar to that shown in FIGS. 6A-C, and the removable attachment mechanism may be similar to that depicted in FIG. 5.

Referring now to FIG. 10, an embodiment of an outer diameter groove extension tip 70 is depicted. A protrusion may extend perpendicular to the front face of the replacement tip 70, and a second protrusion may extend perpendicular from the end of the first protrusion, parallel to the front face of the replacement tip 70, and in the direction of the center of the device. This replacement tip 70 may be particularly useful in measuring the distance between outer faces of an object's grooves, threads, or other small ruts, such as a groove on the outer circumference of a cylinder, or many other distances known to those having ordinary skill in the art. One or more of the dimensions of the first and second protrusions may be known so that an operator may take them into account when determining the measurement indicated by the device. The rear, front, and side views may be substantially similar to that shown in FIGS. 6A-C, and the removable attachment mechanism may be similar to that depicted in FIG. 5.

Referring now to FIG. 1, an embodiment of an inner diameter groove extension tip 72 is depicted. A protrusion may extend perpendicular to the front face of the replacement tip 72, and a second protrusion may extend perpendicular from the end of the first protrusion, parallel to the front face of the replacement tip 72, and in the opposite direction of the center of the device. This replacement tip 72 may be particularly useful in measuring the distance between inner faces of an object's grooves, threads, or other small ruts, such as internal thread on the inner circumference of a cylinder, or many other distances known to those having ordinary skill in the art. One or more of the dimensions of the first and second protrusions may be known so that an operator may take them into account when determining the measurement indicated by the device. The rear, front, and side views may be substantially similar to that shown in FIGS. 6A-C, and the removable attachment mechanism may be similar to that depicted in FIG. 5.

Referring now to FIG. 12, an embodiment of a face groove extension tip 74 is depicted. A protrusion may extend perpendicular to the front face of the replacement tip 74, and a second, smaller protrusion may extend along the same plane from the end of the first protrusion, still perpendicular to the front face of the replacement tip 74. This replacement tip 74 may be particularly useful in measuring the distance between an object's grooves, threads, or other small ruts, such as a groove on the circular face of a cylinder, or many other distances known to those having ordinary skill in the art. The rear, front, and side views may be substantially similar to that shown in FIGS. 6A-C, and the removable attachment mechanism may be similar to that depicted in FIG. 5.

Referring now to FIG. 13, a range extension member 76 is depicted. There may be some instances where the distance to be measured is greater than the length of the device in its fully extended state. By attaching the range extension member 76 to one or both of the replacement tip receivers 50, the operator may increase the functionality of the device, allowing it to measure greater distances. The range extension member 76 may comprise one or more locating pins 58 and one or more threaded screw holes 56 capable of receiving one or more tip mounting screws 52 to removably attach the range extension member 76 to the device. The range extension member 76 may have a replacement tip receiver end comprising one or more locating holes 54 and one or more screw holes 53, such that it may be attached to both the device and any other replacement tip simultaneously. The dimensions of the range extension member 76 may be known so that an operator may take them into account when determining the measurement indicated by the device. Multiple range extension members 76 may be removably attached in series to one or both sides in order to extend the length of the device as required by the operator. The removable attachment mechanism may be similar to that depicted in FIG. 5.

What is claimed as the invention is:
1. A method for manually measuring a distance between a first point and a second point comprising:
   providing a device comprising:
      a first member and a second member that is positioned adjacent to the first member, wherein the first member is capable of sliding with respect to the second member in an axial direction and wherein each of the first and second members is substantially straight and has at least two outer longitudinal sides that are substantially straight and substantially parallel to one another, a first replacement tip receiver at a first location between the two outer longitudinal sides of the first member, wherein a first tip can be removably coupled to the first member at the first location, and wherein the first tip includes a first tip point capable of corresponding to the first point of the distance to be measured;

a second replacement tip receiver at a second location between the two outer longitudinal sides of the second member, wherein a second tip can be removably coupled to the second member at the second location, and wherein the second tip includes a second tip point capable of corresponding to the second point of the distance to be measured; and a first scale that provides a first distance measurement and a second scale that provides a second distance measurement.

2. A method for manually measuring a distance between a first point and a second point comprising:

providing a device comprising:

a first member and a second member that is positioned adjacent and substantially parallel to the first member, wherein the first member is capable of sliding with respect to the second member along a movement axis in order to provide a distance measurement; and a first scale that provides a first distance measurement and a second scale that provides a second distance measurement;

wherein a first tip can be removably coupled to the first member at a first location such that the first tip contacts the first member along the movement axis, wherein the first tip includes a first tip outer end and a first tip inner end, wherein the first tip outer end includes a first tip point capable of corresponding to the first point of the distance to be measured;

wherein a second tip can be removably coupled to the second member at a second location such that the second tip contacts the second member along the movement axis, wherein the second tip includes a second tip outer end and a second tip inner end, wherein the second tip outer end includes a second tip point capable of corresponding to the second point of the distance to be measured;

wherein at least one locating pin is positioned on and integral with at least one of the following: the first member, the second member, the first tip inner end, or the second tip inner end;

wherein at least one screw is capable of being positioned on at least one of the following: the first member, the second member, a first tip inner end, or a second tip inner end; and wherein the first tip, the second tip, or both the first tip and the second tip comprises a tip portion that protrudes substantially perpendicularly outward from the movement axis.

3. A method for manually measuring a distance between a first point and a second point comprising:

providing a device comprising:

a first member and a second member that is positioned adjacent and substantially parallel to the first member, wherein the first member is capable of sliding with respect to the second member along a movement axis in order to provide a distance measurement; and a first scale that provides a first distance measurement and a second scale that provides a second distance measurement;

wherein a first tip can be removably coupled to the first member at a first location such that the first tip contacts the first member along the movement axis, wherein the first tip includes a first tip outer end and a first tip inner end, wherein the first tip outer end includes a first tip point capable of corresponding to the first point of the distance to be measured; and wherein a second tip can be removably coupled to the second member at a second location such that the second tip contacts the second member along the movement axis, wherein the second tip includes a second tip outer end and a second tip inner end, wherein the second tip outer end includes a second tip point capable of corresponding to the second point of the distance to be measured.

* * * * *